United States Patent Office
3,766,224
Patented Oct. 16, 1973

3,766,224
15-METHYL-SUBSTITUTED STEROIDS
Robert V. Coombs, Chatham, N.J., assignor to
Sandoz-Wander, Inc., Hanover, N.J.
No Drawing. Filed June 3, 1971, Ser. No. 149,748
Int. Cl. C07c 169/20
U.S. Cl. 260—397.4                 4 Claims

ABSTRACT OF THE DISCLOSURE

The compounds are 13-(lower)alkyl-15-methylgonenes which have 1,3,5(10); 4- or 5(10)-unsaturation, e.g. 17α-ethynyl-15-methylestra-4-en-17β-ol - 3 - one, which compounds are useful as therapeutic agents.

This invention relates to steroidal compounds, and more particularly to certain 15-methyl-substituted steroids, to their preparation, to intermediates thereof and their preparation, as well as to pharmaceutical compositions containing such compounds and to the use of such compounds.

The compounds of this invention may be conveniently represented by the Formula I:

(I)
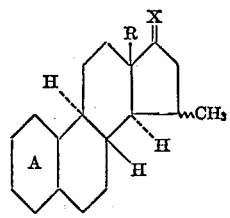

wherein R is unbranched alkyl having from 1 to 3 carbon atoms, i.e. methyl, ethyl or n-propyl; ring A has the structure:

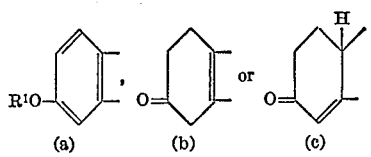

(a)           (b)           (c)

$R^1$ is lower alkyl, e.g. having from 1 to 4 carbon atoms, such as methyl, ethyl, propyl and butyl, and is preferably unbranched; and
X is oxo when ring A has structure (a), and is

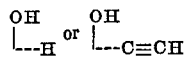

when ring A has either of structures (b) or (c).
Compounds I include 3 classes of compounds, i.e. Compounds Ia, Ib and Ic:

(I)
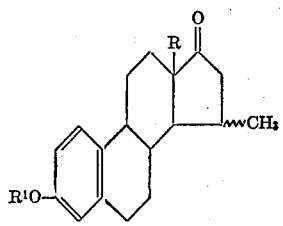

wherein R and $R^1$ are as defined above;

(Ib)
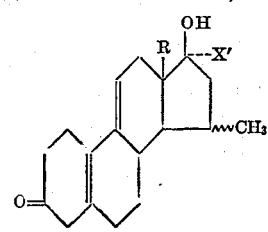

wherein R is a defined above, and X′ is either a hydrogen atom or ethynyl; and (Ic)
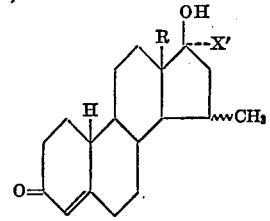

wherein R and X′ are as defined above.

The classes of Compounds Ib and Ic each consist of two sub-groups depending upon whether X′ is a hydrogen atom or ethynyl. Thus a Compound Ib1 is a Compound Ib where X′=H and Ib2 is a Compound Ib where $$X' = -C \equiv CH$$

and similarly for Compounds Ic1 and Ic2.

Compounds Ia may be obtained by Process 1, i.e. reacting a compound of Formula II (II)
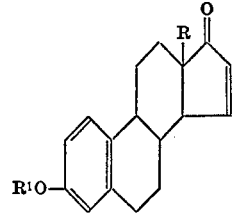

wherein R and $R^1$ are as defined above, with lithium dimethylcopper in a suitable aprotic medium under essentially anhydrous conditions, at moderate temperatures, e.g. −10° to +50° C., preferably at from 0° to 30° C. It is preferable to carry out the reaction under an inert atmosphere, e.g. dry nitrogen and then hydrolyze the resultant product LiSalt of (Ia) to the free Compound Ia. The aprotic medium for Process 1 is preferably an ether, which may be cyclic such as tetrahydrofuran or acyclic, such as diethyl ether, said diethyl ether being particularly preferred. The hydrolysis step may be carried out in a manner conventional for hydrolyzing an alkali metal alcoholate, e.g. by treatment with water or an aqueous solution, such as a concentrated solution of ammonium chloride, or a dilute acid or base.

The lithium dimethylcopper reagent and its preparation is known and may be prepared as reported in Fieser and Fieser "Reagents for Organic Synthesis," vol. II, pages 151–2. A convenient method of preparing the reagent is to slowly add a solution of ethereal methyllithium to an ethereal suspension of cuprous iodide at about 0° C. The product of the reaction is recoverable by conventional means, e.g. quenching with water or an aqueous salt solution, such as concentrated aqueous ammonium chloride, extraction with an inert organic solvent, and removal of the solvent by evaporating at reduced pressure.

Compounds II are known (J.A.C.S. 79, 2005 [1957]) and may be prepared by methods described in the literature and those not known may be prepared in a manner analogous to the preparation of the known compounds.

Compounds Ia may be converted to Compounds Ib or Ic by conventional methods, e.g. by first reducing a Compound Ia to its 17-hydroxy-25(10)-diene analog (A) which is then oxidized at the 17-position to obtain the 17-oxo-2,5(10)-diene analog (B) which may then be reduced with a complex hydride reagent to the corresponding 17β-hydroxy, 2,5(10)-diene (C), or treated by conventional means, e.g. by condensing with a metallo-acetylenic reagent, to obtain the corresponding 17α-ethynyl, 17β-hydroxy-2,5(10)-diene (D); upon acid hydrolysis Compounds C and D yielding a corresponding Compound Ib or Ic.

The above-described reactions are conveniently represented by Reaction Scheme A, wherein R, R¹, and (Ib1), (Ib2), (Ic1, and (Ic2) are as defined above:

REACTION SCHEME A

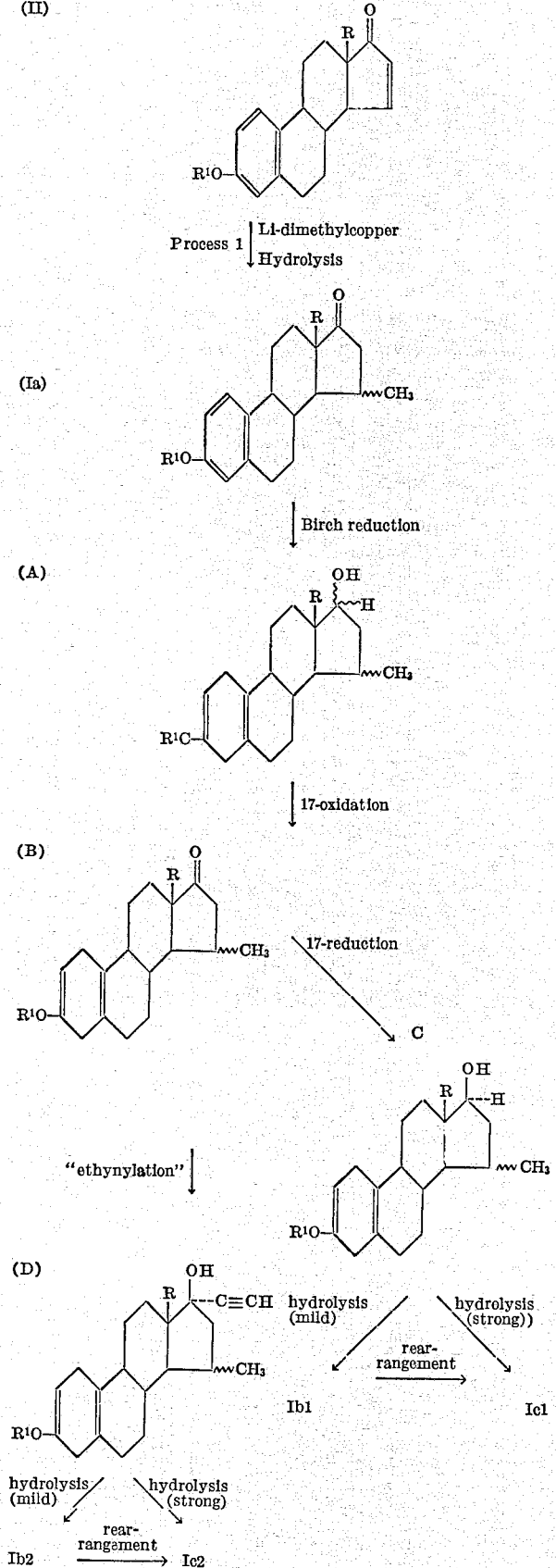

The reduction of a Compound Ia to its corresponding Compound A may conveniently be effected employing the Birch reduction, which broadly involves use of a light metal, e.g. sodium, potassium or lithium, in liquid ammonia, in the presence of a proton donor such as a lower alcohol, e.g. t-butanol or ethanol, the ammonia serving conveniently as the reaction medium, the temperature and pressure being controlled so as to maintain the ammonia in liquid state. Preferably the reaction is performed at a temperature of from −70° to +30° C., preferably at the reflux temperature of the ammonia. The reaction is conveniently effected under atmospheric pressure. If desired, an inert organic solvent, such as an ether, e.g. tetrahydrofuran, may be employed.

The oxidation of a Compound A to its corresponding Compound B, may be carried out in conventional manner for oxidizing a secondary hydroxy function to a keto function, for example by employing the well known Oppenauer oxidation technique which broadly involves the use of a metallic alkoxide and a ketone, e.g. aluminum isopropoxide and 2-butanone. A suitable reaction temperature is from 60° to 130° C. Suitable solvents include benzene and toluene.

The reduction of a Compound B to its corresponding Compound C may be carried out in conventional manner employing a light metal hydride, e.g. $NaBH_4$ or $LiAlH_4$, under conventional conditions, e.g. employing ethanol or ethanol/methylene chloride as solvent when $NaBH_4$ is used and tetrahydrofuran when $LiAlH_4$ is used.

The "ethynylation" of a Compound B to its corresponding Compound D, i.e. the conversion of the 17-oxo function of a Compound B to a 17β-hydroxy, 17α-ethynyl system, may be accomplished in the conventional manner for carrying out such conversions, e.g. by treating a Compound B with a suitable metallo-ethynyl reagent under conditions usually associated with Grignard reactions and hydrolyzing the resultant salt of Compound B to Compound D. The reaction may be carried out in a medium such as an acyclic ether, e.g. diethyl ether, or a cyclic ether, e.g. tetrahydrofuran or dioxane, or ethylene-diamine or mixtures thereof, under essentially anhydrous conditions at moderate temperatures, e.g. −30 to +50° C., preferably at 0° to +30° C. The metallo-portion of the metallo-ethynyl reagent may be e.g. an active metal, such as an alkali metal, e.g. Li, Na or K, or a magnesium iodide or bromide cation. Optionally, an inert-organic co-solvent may be included in the reaction mixture, such as dimethylsulfoxide or an aromatic solvent such as benzene or toluene, particularly where a metallo-ethynyl reagent-medium complex is separately prepared or obtained from a commercial source. It is preferred to carry out the reaction in an inert atmosphere, e.g. under dry nitrogen. A preferred metallo-ethynyl reagent is lithium acetylide/ethylenediamine complex. The hydrolysis may be carried out by use of water or an aqueous salt or base, e.g. saturated aqueous sodium chloride or dilute sodium hydroxide.

The hydrolysis of a Compound C or D to its corresponding Compound Ib or Ic (Process h) is carried out in a conventional manner. The hydrolysis is conveniently carried out under aqueous acidic conditions and may suitably be carried out at a temperature of, for example, from 0° to 100° C., preferably from 20° to 70° C. An inert, water-miscible organic solvent may be employed, preferably a lower alcohol such as methanol. Where a water-soluble organic acid is employed to create the acid conditions, such may be used in excess to provide the solvent. Co-solvents may also be used.

Where a Compound Ic1 or Ic2 is required, the process is suitably carried out under strongly acid conditions (Process h1), i.e. at a pH value of less than 3 or, alternatively, under mild acid conditions (Process h2), i.e. at a pH value of, for example, from 3 to 4, but over a relatively prolonged period, for example in excess of 3 hours. Conversely, where a Compound Ib1 or Ib2 is required, the mild acid conditions described should preferably be employed, over a relatively short period, for example under 3 hours. Conventional water-soluble inorganic or organic acids, e.g. sulphuric acid, hydrochloric acid, p-toluene sulphonic acid or oxalic acid, may suitably be used to provide the strongly acidic conditions, and water-soluble organic acids, e.g. oxalic acid or acetic acid, may suitably be used to provide the milder acidic conditions.

The conversion of a Compound Ib1 or Ib2 to its corresponding Compound Ic1 or Ic2, involves a rearrangement (Process r) and may suitably be carried out under acid or basic conditions.

Basic rearrangement (Process r1) may suitably be effected in an inert organic solvent, which preferably is water-miscible, under aqueous or anhydrous conditions. Suitable such solvents include dioxane, methanol and ethanol. The basic conditions may conveniently be obtained under aqueous conditions by using, e.g. aqueous sodium or potassium hydroxide, preferably at a concentration of from 0.01 N to 2 N, or under anhydrous conditions by using, e.g. methanolic KOH or an alkali metal lower alkoxide such as sodium methoxide. A suitable reaction temperature is from 20° to 120° C., preferably the reflux temperature of the reaction mixture. Suitable reaction times vary, for example from ¼ hour to 6 hours.

Acid rearrangement (Process r2) may suitably be carried out as described above (in Process h1) for producing a compound in which ring A has structure (a). However, the aqueous nature of the conditions, essential in Process h1, are not essential in Process r and, accordingly, a water-miscible solvent need not be used.

The Compounds I of this invention are useful because they possess pharmacological properties in animals.

Compounds Ia possess estrogenic activity as indicated in the mouse and rat by the method basically described in Endocrinology 65 (1959) 265 and Am. J. Physiol. 189 (1957) 355, respectively, and are particularly useful in treating estrogen deficiencies in animals, in controlling fertility in mammals, and in regulating estrus and the menstrual cycle. Compounds Ib2 and Ic2 possess progestational activity as indicated by the well-known Clauberg test, i.e. the method basically described in Endocrinology 63 (1958) 464 wherein the rabbit is given 0.01 mg. to 1.0 mg. of active agent, and are particularly useful in controlling fertility in mammals and in the regulation of estrus and the menstrual cycle. Compounds Ib1 and Ic1 possess anti-androgenic activity as indicated in comparative tests in which the relative weight of ventral prostates of a group of castrated immature male rats treated (intramuscularly) with a standard (testosterone propionate) are compared to those of a group treated with said compounds plus the standard, and are useful as anti-androgenic agents in mammals.

Compounds I may be combined with a pharmaceutically acceptable carrier or adjuvant and may be administered orally or parenterally in a conventional manner. The dosage will vary depending upon the mode of administration utilized and the particular compound employed. However, in general for the abovedescribed respective uses, satisfactory results are obtained when Compounds Ia are administered at a daily dosage of from about 0.5 mg. to 20 mg., when Compounds Ib2 or Ic2 are administered at a daily dosage of from about 0.1 mg. to 20 mg. and when Compounds Ib1 or Ic1 are administered at a daily dosage of about 1 mg. to 20 mg. The daily dosage of a Compound I may be given in a single dose, in equally divided doses, e.g. 1 to 2 times a day, or in sustained release form. It will be appreciated by those skilled in the art, that the daily dosage level is independent of body weight. Dosage forms suitable for internal administration comprise from about 0.05 mg. to about 20 mg. of a Compound I in admixture with a solid or liquid pharmaceutical carrier or diluent.

In the following examples which are presented as illustrating, but not limiting this invention, all temperatures as centigrade, and room temperature is 20° to 30° C., unless indicated otherwise.

EXAMPLE 1

17α-ethynyl-15-methylestra-5(10)-en-17β-ol-3-one

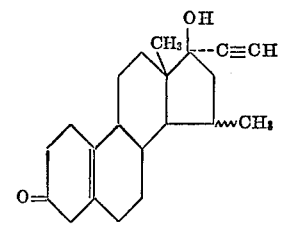

Step A.—15 methylestrone methyl ether: A solution of lithium dimethylcopper is prepared by adding dropwise 15.5 ml. of a 1.6 molar solution of methyllithium in anhydrous ether, further diluted with 20 ml. of anhydrous ether, to a suspension of 1.9 g. of cuprous iodide in 20 ml. of anhydrous ether cooled to 0°, under nitrogen. A yellow precipitate forms which dissolves, again on stirring for 30 minutes to give a clear solution. To this solution is added dropwise a solution of 1.4 g. of 15, 16-dehydroestrone methyl ether in 40 ml. of dry tetrahydrofuran, the temperature being kept at 0–5°. When the addition is complete, the mixture is allowed to warm to room temperature and stirred for 15 hrs. The reaction mixture is then poured into 200 ml. of a saturated aqueous solution of ammonium chloride and extracted with ether. The combined ether extracts are dried over anhydrous sodium sulfate ($Na_2SO_4$) and evaporated to give a crystalline residue which is recrystallized from ether, yielding 15-methylestrone methyl ether, M.P. 122–124°.

Step B.—15-methylestra-2,5(10)-dien-3,17-diol 3-methyl ether: A solution of 2.9 g. of 15-methylestrone methyl ether in 45 ml. of tetrahydrofuran and 45 ml. of t-butanol is added to 100 ml. of ammonia under reflux. A total of 1.25 g. of lithium is then added in portions over 10 minutes and the resulting blue solution is stirred under reflux for 6 hrs. The ammonia is allowed to evaporate (about 18 hours) and 20 ml. of methanol is then added to the residue, followed by 30 ml. of water and 200 ml. of brine. The two phases are separated and the organic layer is washed with brine, dried over anhydrous sodium sulfate and evaporated to give 15-methylestra-2,5-(10)-dien-3,17-diol 3-methyl ether as a foam characterized by the absence of ultra-violet absorption at 280 mµ.

Step C.—3 - methoxy-15-methylestra-2,5(10)-dien-17-one: A mixture of 3 g. of 15-methylestra-2,5(10)-dien-3,17-diol 3-methyl ether and 2.4 g. of aluminum isopropoxide in 45 ml. of benzene and 20 ml. of 2-butanone is stirred and refluxed for 18 hrs. using a water-separator. After cooling the reaction mixture is then added to 50 ml. of 2 N sodium hydroxide solution and a further 50 ml. of benzene are added. The organic layer is separated, washed with water and brine and dried over anhydrous sodium sulfate. Removal of the solvent gives a residue, which after crystallization from methanol yields 3-methoxy-15-methylestra-2,5(10)-dien-17-one M.P. 135–137°.

Step D.—17α-ethynyl - 15 - methylestra-2,5(10)-dien-3, 17β-diol 3-methyl ether: A solution of 1.7 g. of 3-methoxy-15-methylestra-2,5(10)-dien-17-one in 20 ml. of dimethylsulfoxide is added to a solution of 5 g. of lithium acetylide/ethylene diamine complex in 50 ml. of dimethylsulfoxide at room temperature under nitrogen. The reaction mixture is stirred for a further 6 hours at room temperature and then poured onto ice-water, and extracted with ether. The ether extract is dried over anhydrous sodium sulfate and concentrated to give crude 17α-ethynyl-15-methyl-estra-2,5(10)-dien-3, 17β-diol 3-methyl ether which is used as such for the next step.

Step E. — 17α-ethynyl-15-methylestra-5(10)-en-17β-ol-3-one: A mixture of 500 mg. of 17α-ethynyl-15-methylestra-2,5(10)-dien-3,17β-diol 3-methyl ether and 8 ml. of glacial acetic acid containing 2 ml. of water is stirred at room temperature for 2½ hours by which time a clear solution results. It is then carefully added to 50 ml. of saturated sodium bicarbonate solution and extracted with ether. The ether extract is washed with brine and then dried over anhydrous sodium sulfate and concentrated. There is obtained 17α-ethynyl-15-methylestra-5(10)-en-17β-ol-2-one.

EXAMPLE 2

17α-ethynyl-15-methylestra-4-en-17β-ol-3-one

To a solution of 500 mg. of 17α-ethynyl-15-methylestra-2,5(10)-diene-3,17β-diol 3-methyl ether (Step D, Example 1) in 10 ml. of methanol are added 5 drops of concentrated hydrochloric acid and the mixture is left at room temperature for 2 hours. The methanol is evaporated under reduced pressure and to the residue is added 50 ml. of sodium bicarbonate solution and 100 ml. of ether. The ether layer is separated and washed with brine before being dried over anhydrous sodium sulfate and concentrated. The residue obtained is crystallized from ether to give 17α-ethynyl-15-methylestra-4-en-17β-ol-3-one, M.P. 194–196°.

EXAMPLE 3

17α-ethynyl-15-methylestra-4-en-17β-ol-3-one

Following the procedure described in Example 2, but replacing the 17α-ethynyl-15-methylestra-2,5(10)-diene-3,17β-diol-3-methyl ether used therein with an equivalent amount of 17α-ethynyl-15-methylestra-5(10)-en-17β-ol-3-one, (Example 1) there is obtained 17α-ethynyl-15-methylestra-4-en-17β-ol-3-one.

EXAMPLE 4

15-methylestra-5(10)-en-17β-ol-3-one

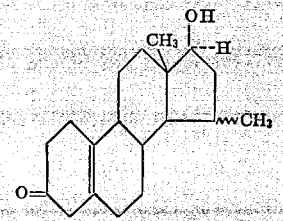

Step A. — 15 - methylestra-2,5(10)-diene-3,17β-diol-3-methyl ether: To a solution of 362 mg. of 3-methoxy-15-methylestra-2,5(10)-dien-17-one (Example 1, Step C) in a mixture of 5 ml. of methylene chloride and 5 ml. of anhydrous ethanol, there is added, at +5°, 80 ml. of sodium borohydride and the mixture is stirred at 0 to 5° for 3 hours. 10 ml. of saturated aqueous tartaric acid solution is then added and the methylene chloride layer worked up (separation, washing, drying over sodium sulfate and evaporation) to yield 3-methoxy-15-methylestra-2,5(10)-diene-3,17β-diol 3-methyl ether.

Step B. — 15-methylestra-5(10)-en-17β-ol-3-one: Following the procedure described in Step E of Example 1, but using an equivalent amount of the product of Step A of this example in place of the 17α-ethynyl-15-methylestra-2,5(10)-diene-3,17β-diol 3-methyl ether used therein there is obtained 15-methylestra-5(10)-en-17β-ol-3-one.

EXAMPLE 5

15-methylestra-4-en-17β-ol-3-one

Following the procedure described in Example 2, but replacing the 17α-ethynyl-15-methylestra-2,5(10)-diene-3,17β-diol 3-methyl ether used therein, with an equivalent amount of 15-methylestra-2,5(10)-diene-3,17β-diol 3-methyl ether, there is obtained 15-methylestra-4-en-17β-ol-3-one M.P. 138–140°.

The products of Example 1, Step B; Example 1, Step D; and Example 4, Step A, may alternatively be designated as 3-methoxy-15-methylestra-2,5(10)-dien-17-ol; 17α - ethynyl - 3 - methoxy-15-methylestra-2,5(10)-dien-17β-ol and 3-methoxy - 15 - methylestra-2,5(10)-dien-17β-ol, respectively.

EXAMPLES 6 and 7

Tablets and capsules suitable for oral administration

Tablets and capsules containing the ingredients indicated below may be prepared by conventional techniques and are useful in the control of fertility in mammals:

| Ingredient | Weight (mg.) | |
|---|---|---|
| | Tablet | Capsule |
| 17α-ethynyl-15-methylestra-4-en-17β-ol-3-one | 0.5 | 0.5 |
| Tragacanth | 10 | |
| Lactose | 247 | 299.5 |
| Corn starch | 25 | |
| Talcum | 15 | |
| Magnesium stearate | 2.5 | |
| Total | 300 | 300 |

EXAMPLES 8 and 9

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the control of fertility in mammals. The injectable suspension and oral liquid suspension are suitably administered once a day for this purpose.

| Ingredient | Weight (mg.) | |
|---|---|---|
| | Sterile injectable suspension | Oral liquid suspension |
| 17α-ethynyl-15-methylestra-4-en-17β-ol-3-one | 0.2 | 0.5 |
| Sodium carboxy methyl cellulose U.S.P. | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | ¹Q.S. |
| Color | | ¹Q.S. |
| Methyl paraben U.S.P. | | 4.5 |
| Propyl paraben U.S.P. | | 1.0 |
| Polysorbate 80 (e.g. Tween 80) U.S.P. | | 5 |
| Sorbitol solution 70% U.S.P. | | 2.500 |
| Buffer agent to adjust pH for desired stability | ¹Q.S. | Q.S. |
| Water | (²) | (³) |

¹ Q.S. = Quantity sufficient.
² For injection quantity sufficient to 1 ml.
³ Quantity sufficient to 5 ml.

What is claimed is:
1. A process for the preparation of a 15-methylsubstituted compound of the formula

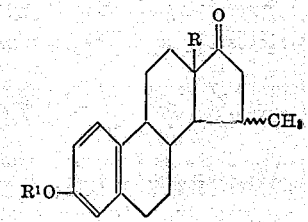

wherein:
R is unbranched alkyl having from 1 to 3 carbon atoms; and
R¹ is alkyl, having from 1 to 4 carbon atoms; which comprises reacting a compound of the formula

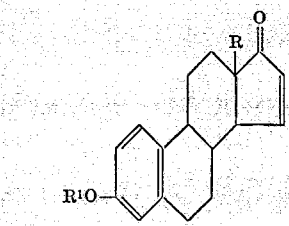

wherein R and R¹ are as defined above, with a lithium dimethyl copper reagent in an aprotic medium under essentially anhydrous conditions at a temperature of from −10° to +50° C. to obtain an intermediate salt, which is the lithium salt of the 15-methyl-substituted compound, and hydrolyzing the intermediate salt to obtain the 15-methyl-substituted compound.

2. A process of claim 1 wherein R is methyl.

3. A proces of claim 1 wherein each of R and R' is methyl.

4. A process of claim 3 wherein the temperature is from 0° to 30° C.

References Cited

FOREIGN PATENTS 1,010,051  11/1965  Great Britain _____ 260—397.4
1,010,053  11/1965  Great Britain _____ 260—397.4

OTHER REFERENCES

Jour. Chem. Soc. (1960) Ellis et al. pp. 2389–2391.
Fieser et al.: "Steroids" (1959) pp. 589 and 592 relied on.

ELBERT L. ROBERTS, Primary Examiner

U.S. Cl. X.R.

260—397.5; 424—243